United States Patent [19]
Hajek et al.

[11] Patent Number: 5,052,332
[45] Date of Patent: Oct. 1, 1991

[54] APPARATUS AND SYSTEM FOR STEAM CLEANING AND COATING OF LAMINATED ARTICLES

[75] Inventors: Bedrich Hajek, New Haven; Donald J. Gillette, Guilford, both of Conn.

[73] Assignee: S. L. Electrostatic Technology, Inc., Branford, Conn.

[21] Appl. No.: 493,791

[22] Filed: Mar. 15, 1990

[51] Int. Cl.$^5$ .......................... B05B 5/08; B05B 5/03; B08B 3/02
[52] U.S. Cl. ..................... 118/72; 118/634; 118/DIG. 5; 15/302; 15/306.1; 15/309.2; 134/102; 134/107; 134/108; 134/148; 134/199
[58] Field of Search ................. 15/302, 309.2, 306.1, 15/309.1; 134/102, 107, 108, 148, 199; 118/72, 634, DIG. 5; 427/315, 27, 33

[56] References Cited

U.S. PATENT DOCUMENTS

| | | | |
|---|---|---|---|
| 3,865,610 | 2/1975 | Goodridge et al. | 427/14.1 |
| 3,889,015 | 6/1975 | English | 427/21 |
| 3,901,185 | 8/1975 | Goodridge et al. | 118/630 |
| 3,904,346 | 9/1975 | Shaw et al. | 427/29 |
| 3,921,574 | 11/1975 | English | 118/106 |
| 4,391,016 | 7/1983 | Kawamura et al. | 15/302 |

*Primary Examiner*—Evan Lawrence
*Attorney, Agent, or Firm*—Ira S. Dorman

[57] ABSTRACT

The apparatus and system utilize sprays of steam to clean the exterior or laminated objects, preliminary to electrostatic powder coating, as well as to effect volatilization of liquid contaminates trapped between lamina thereof. Off-gassing that would otherwise occur when the objects are heated to effect fusion of the powder deposit is thereby avoided. The apparatus includes a conveyor for transporting a workpiece along a horizontal travel path through a chamber, above and below which path a spray compartment and collecting compartment are defined, respectively.

8 Claims, 4 Drawing Sheets

APPARATUS AND SYSTEM FOR STEAM CLEANING AND COATING OF LAMINATED ARTICLES

BACKGROUND OF THE INVENTION

It is now common practice to coat workpieces by electrostatically depositing a layer of particulate resinous material upon them, thereafter integrating the particles using thermal fusion or other appropriate means. As shown for example in U.S. Pat. No. 3,865,610, issued Feb. 11, 1975, No. 3,889,015, issued June 10, 1975, No. 3,901,185, issued Aug. 26, 1975, and No. 3,921,574, issued Nov. 25, 1975 (all of common assignment herewith), this technique has been utilized for insulating the slots and end surfaces of electric motor armature cores, and it is now widely used for that purpose on an industrial scale.

Armature cores are conventionally manufactured in the form of stacked lamina, punched or otherwise formed from metal plate. Lubricating substances are of course utilized in such metal cutting and forming operations, and as a practical matter some residual lubricant is almost invariably retained on the surfaces of the metal element, despite efforts made to remove it. The presence of such substances will intefere with the production of satisfactory insulating layers, and therefore a degreasing step is normally employed preliminarily to powder coating of the component, carried out in-line with the subsequent deposition and fusion steps.

As presently practiced however, degreasing does not effectively remove matter trapped between the lamina. As a result, residual lubricants and the like will volatilize during the heating that is carried out to effect fusion of the powder deposit, with the consequential off-gassing tending to produce pores and other electrical and physical defects and discontinuities.

It is of course common practice to use steam for removing grease and dirt from machinery, such as vehicle engines and the like. Also, Kawamura et al U.S. Pat. No. 4,391,016 discloses apparatus for degreasing elongated members, such as rod stock, which includes degreasing and predrying chambers; in the latter, steam is utilized to effect predrying.

Chlorinated and fluorinated hydrocarbon solvents, such as trichloroethylene and Freon products, are widely employed for metal degreasing, but such solvents are of course ecologically and environmentally undesirable; their use is therefore subject to serious constraints, imposed to maintain safe and pleasant working conditions and to ensure proper disposal. Because of their particularly noxious character, the vapors of such substances must not be permitted to escape into the atmosphere, and consequently they are normally used at relatively low temperatures, to avoid excessively active fuming, and are contained in tanks fitted with condensing coils for confining the vapors. As a result a relatively complex conveyor system must be employed to permit introduction of the workpieces at a level above the condensing coils, and passage therebelow for degreasing.

SUMMARY OF THE INVENTION

Accordingly, it is a broad object of the present invention to provide a novel system and method by which workpieces, and especially electrical components of laminated construction, can be cleaned and coated in a continuous, in-line operation so as to enable the production of high quality, pore-free coatings thereupon.

A more specific object of the invention is to provide such a system and method in which lubricants, and other such substances, can be volatilized and thereby expelled from between adjacent lamina of a workpiece during the cleaning phase of operation.

Another more specific object is to provide such a system in which is included a conveyor, operating on a single level, for transporting the parts through the cleaning and coating zones.

yet another specific object of the invention is to provide a highly effective and novel cleaning apparatus which is especially well suited for use in a system and method having the foregoing features and advantages.

DETAILED DESCRIPTION OF THE ILLUSTRATED EMBODIMENTS

Figure 1:
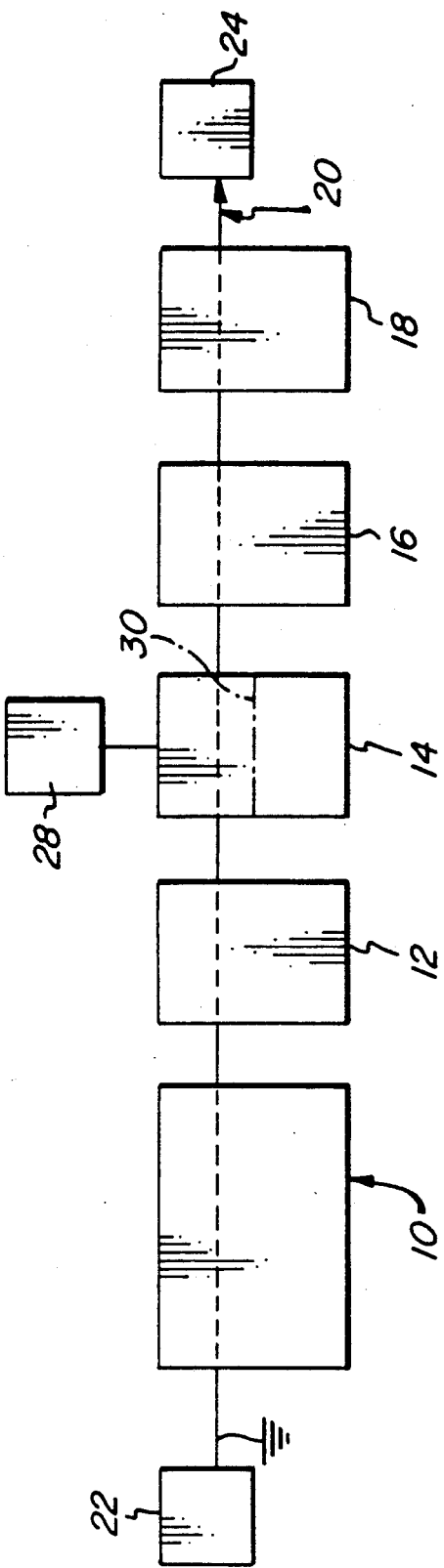
FIG. 1 is a schematic representation of a cleaning and coating system embodying the present invention.

Turning now in detail to FIG. 1 of the appended drawings, therein illustrated schematically is a cleaning and coating system embodying the present invention. It includes a degreasing unit, generally designated by the numeral 10, followed sequentially by a cooling unit 12, an electrostatic fluidized bed coating unit 14, a heating unit 16, and a second cooling unit 18. An electrically grounded conveyor mechanism, generally designated by the numeral 20 and having loading and unloading stations 22, 24 at its opposite ends, passes on a single level horizontally through each of the units 10, 12, 14, 16, and 18, to transport individual parts in the direction illustrated by the arrow in FIG. 1. A powder supply arrangement 28 is operatively connected to the coating unit 14, in which is disposed a porous support member 30, as is conventional.

Figure 2:
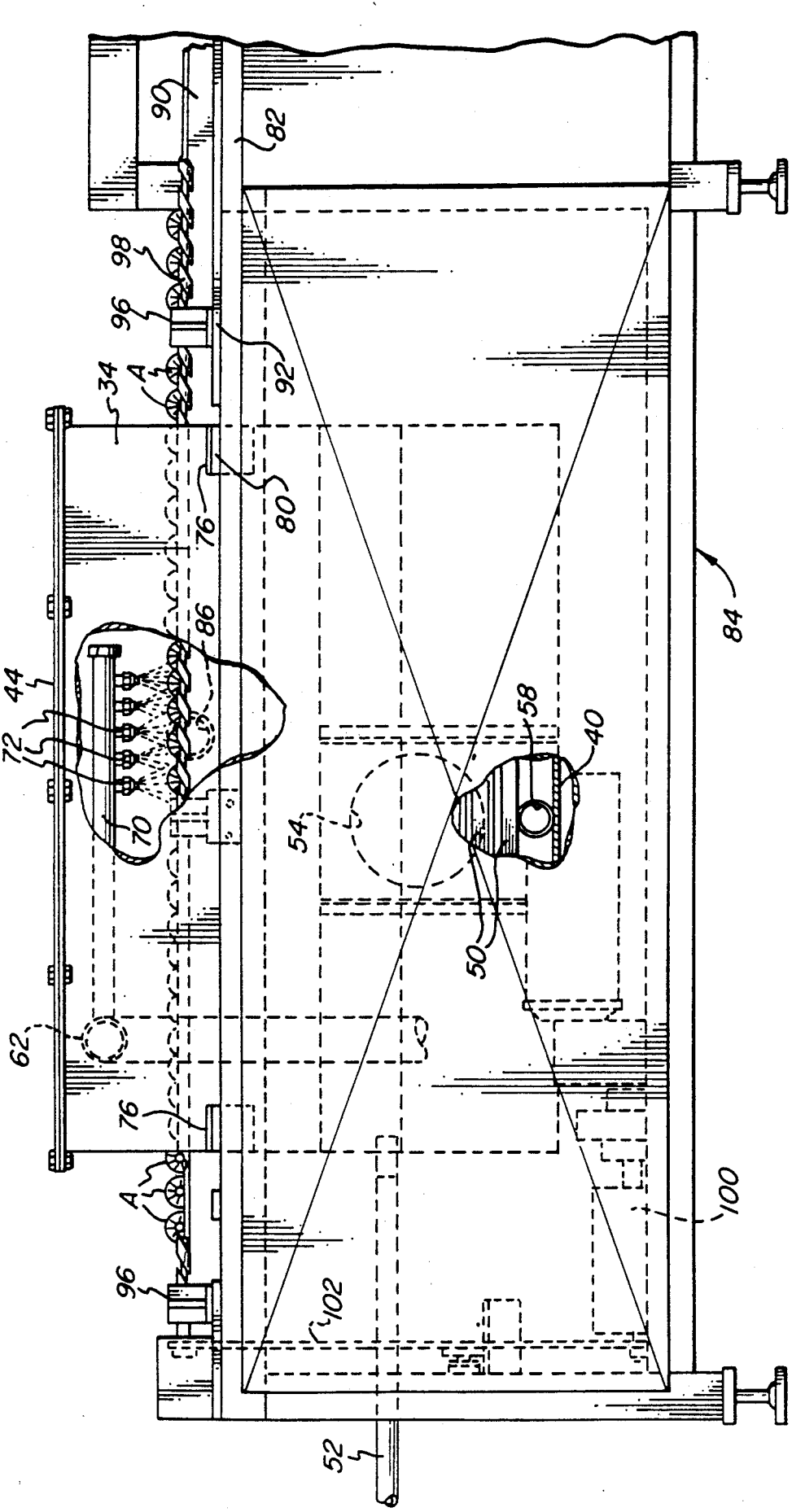
FIG. 2 is a fragmentary front elevational view of cleaning apparatus embodying the present invention and suitable for use in the system hereof, with housing portions broken away to expose internal features.
Figure 3:
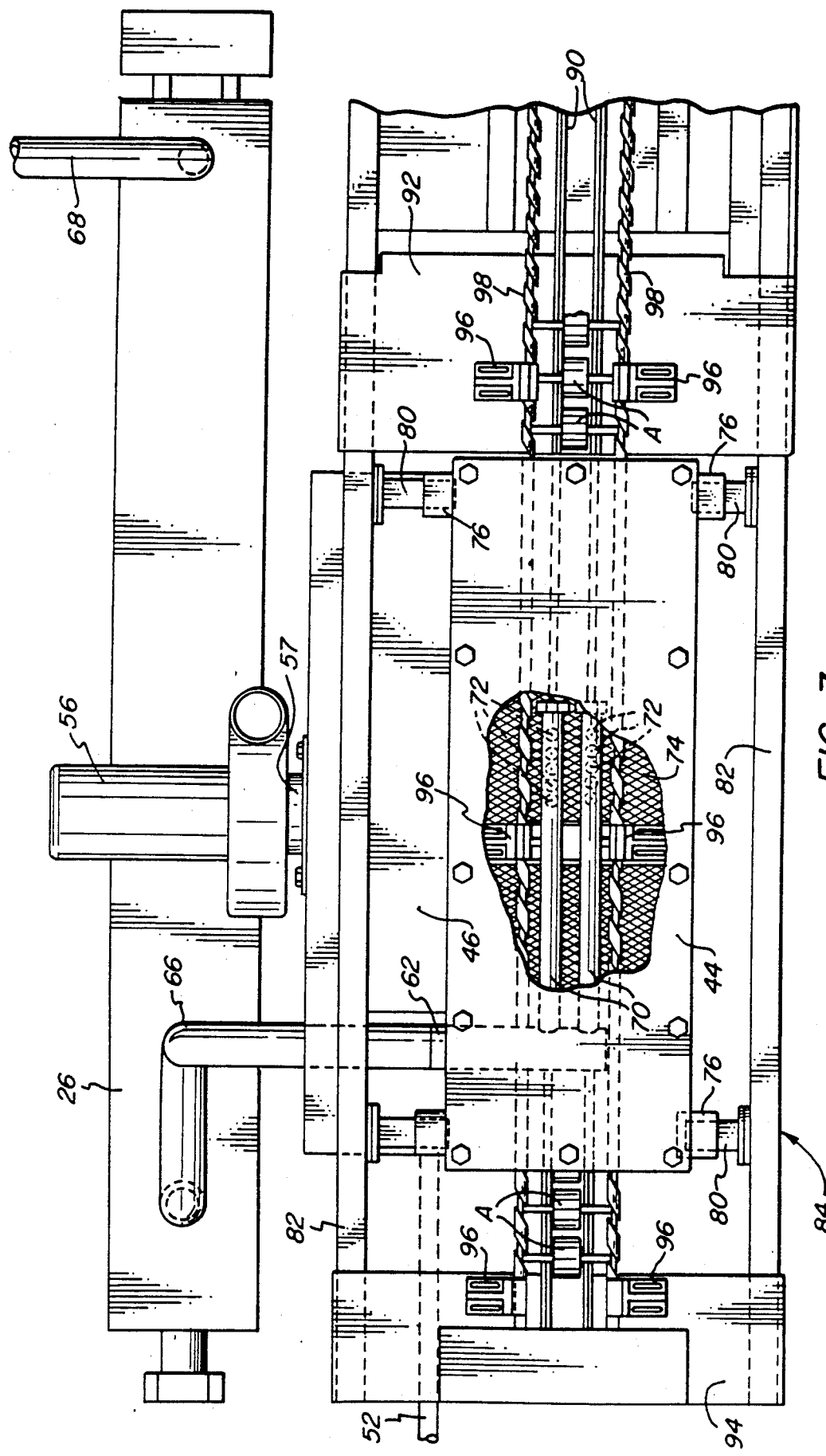
FIG. 3 is a fragmentary plan view of the apparatus of FIG. 2, with a cover portion broken away to expose internal features.
Figure 4:
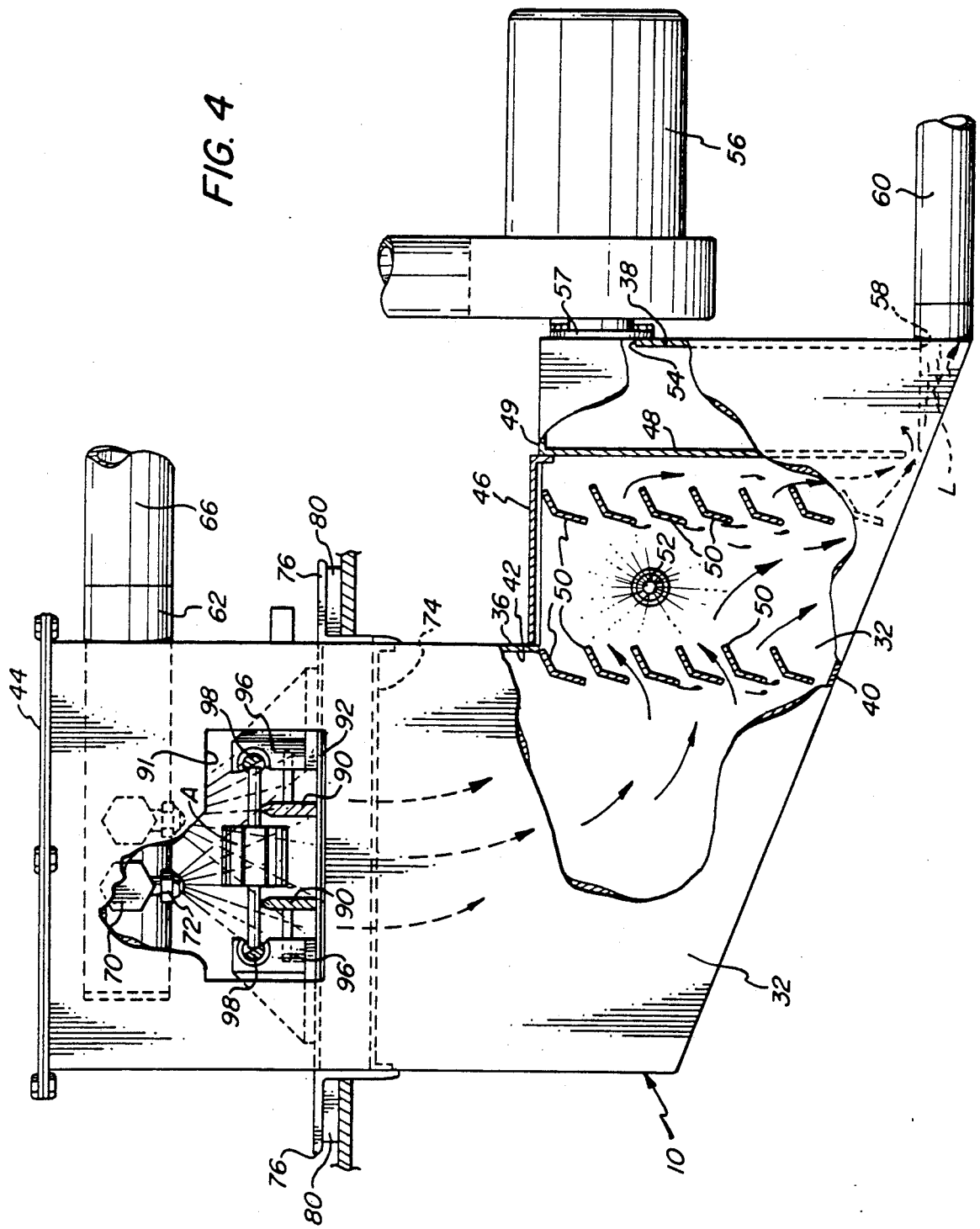
FIG. 4 is a fragmentary, right-end view of the apparatus of the foregoing Figures, drawn to a somewhat enlarged scale and again having portions broken away to show internal features.

Turning now to FIGS. 2–4, it will be seen that the enclosure of the degreasing unit 10 consists of a pair of generally L-shaped end walls 32, a front wall 34, upper and lower rear walls 36 and 38, respectively, and an inclined bottom wall 40. The several walls cooperatively define an internal chamber 42, which includes a forward cleaning compartment and a collecting compartment rearwardly offset therefrom at a level generally therebelow. The forward compartment is closed by a cover 44, which is bolted in place, and the top of the collecting compartment is closed by a plate 46 that is set into an opening in the overlying upper wall 49.

Disposed near the rear of the collecting compartment is a depending partition 48, which is attached to the overlying wall 49 and extends to a point short of the bottom wall 40. Elongated baffle elements 50, arranged in two transversely spaced columns, span the sidewalls 32 in front of the partition 48, and a spray tube 52 extends through one of the end walls 32 into the space therebetween, cooperatively creating a condenser section within the collecting compartment. A relatively large opening 54 is formed through the upper portion of the rear wall 38, to provide communication with an electric exhaust fan 56 mounted by flange assembly 57, and an outlet port 58 is formed at the lower end of the rear wall 38, adjacent the bottom wall 40, to communicate with the drain pipe 60.

Extending through the upper rear wall 36 is a steam manifold 62, which is connected to the superheater 26 by conduit 66; a thermocouple (not shown) enables monitoring of the temperature therewithin. Inlet conduit 68 supplies saturated steam to the superheater 26, and two parallel pipes 70, each carrying a set of five downwardly directed nozzles 72, extend longitudinally within the chamber 42 from the manifold 62. Screen 74 spans the enclosure in a horizontal plane below the nozzles 72, and serves of course to prevent parts from dropping into the collecting compartment. A number of brackets 76 attached to the enclosure provide flange portions that extend forwardly and rearwardly from the walls 34 and 36, respectively, to support the unit 10 upon the upper beams 82 of the machine frame, generally designated by the numeral 84; heat-insulating pads 80 are interposed therebetween.

Two transversely spaced upstanding rails 90 extend parallel to one another along the top of the frame 84, passing through the aligned inlet and outlet openings 91 in the end walls 32 (only the outlet opening is visible). They rest upon the plates 92 and 94, which also support pairs of brackets 96, transversely aligned t opposite sides of the rails 90. The brackets 96 rotatably support parallel conveyor screws 98, which also extend through the openings 91 and cooperate with the rails to provide a length of the conveyor mechanism 20 depicted in FIG. 1, and an electric motor 100 is mounted within the lower portion of the frame 84; the motor is operatively connected to the screws 98 through a belt 102, as well as to other mechanisms of the system (by means not shown). Panel 104 (and other similar panels, not shown) is suitably attached to enclose the illustrated section of the frame.

In operation, the objects to be cleaned and coated, depicted herein as armatures A, are initially loaded at station 22 onto the upstanding rails 90 with the opposite ends of their shafts engaged within the threads of the screws 98; they are grounded through the conveyor mechanism 20. The motor 100 serves of course to rotate the screws, causing them to carry the armatures forwardly through the enclosure of the cleaning unit 10, supported by the rails 90 and rotated by coaction therewith.

In the chamber 42 the armatures A will be subjected to high-pressure sprays of superheated steam, discharged from the nozzles 72. The steam will not only remove lubricant and other contamination (including dirt and metal fragments) from the exposed surfaces, but it will also heat the armatures to an elevated temperature, typically on the order of 700° F. At such temperatures the lubricants and other normally liquid contaminants will exist in the gaseous state; consequently, the steam will effect volatilization, expelling and flashing-off any liquids that may be present between the lamina of the cores.

After exiting the degreasing enclosure, the cleaned armatures A will pass in sequence through the cooling, coating, heating and cooling units, 12, 14, 16, and 18, respectively. In the course of doing so they will be electrostatically coated in a conventional manner, ultimately being off-loaded at location 24.

The contaminated steam from the upper portion of the forward chamber compartment will be drawn by exhaust fan 56 through the screen 74 and into the space between the columns of baffle elements 50. At that location a spray of water injected through the pipe 52 will effect condensation of any condensible fractions (e.g., of the steam, and of any contaminating substances) that may be present in the gaseous stream, with the resultant condensate liquid L passing under the internal partition 48, through the port 58, and into the drain pipe 60, to be discharged directly or conducted to a water treatment facility, as appropriate.

Any contaminating substance that is gaseous at the temperature to which the armatures are subjected to effect fusion of the coating powder deposited in the unit 14, will of course volatilize under those conditions. The resultant off-gassing will cause pore formation and other defects in the coating ultimately produced, leading to electrical and physical discontinuity and therefore to rejection of the part. As discussed above, the present invention obviates such problems. Moreover, the use of steam in the cleaning operation is highly beneficial from ecological and environmental standpoints; and by avoiding any need for dipping of the workpiece into a solvent vapor tank, the process enables the use of a relatively simple conveyor system, operating horizontally and in a single plane.

Thus, it can be seen that the present invention provides a novel system, method and apparatus by and with which workpieces, and especially electrical components of laminated construction, can be cleaned and coated in a continuous, in-line operation so as to enable the production of high quality, pore-free coatings thereupon. Metal-forming lubricants, and other substances that volatilize a elevated temperatures, will inherently be expelled from between adjacent lamina of a workpiece during the cleaning phase of operation, and the conveyor used for transporting the parts through the cleaning and coating zones can operate on a single level.

Having thus described the invention, what is claimed is:

1. Apparatus for cleaning a workpiece transported therethrough, comprising:
   an enclosure defining a chamber with entrance and exit openings thereinto and therefrom;
   means for transporting a workpiece along a travel path having a section extending through said chamber and between said openings of said enclosure, said travel path section lying substantially entirely in a single horizontal plane and demarcating within said chamber a spray compartment thereabove and a collection compartment therebelow;
   spray means, disposed within said spray compartment, for discharging steam upon a workpiece transported along said travel path section;
   condenser means in said collection compartment for effecting condensation of vaporous substances entering thereinto;
   drain means for withdrawing liquids condensed in said collection compartment; and
   supply means operatively connected to said spray means for supplying steam thereto.

2. The apparatus of claim 1 wherein said means for transporting comprises a conveyor extending along said travel path section and having spaced members adapted to rotatably and drivingly engage the ends of oppositely extending shaft portions of a transported workpiece; and wherein said spray means comprises a plurality of nozzles arranged in a bank extending along said travel path section between and above said spaced members of said conveyor, said apparatus thereby being adapted for the cleaning of armatures having a cylindrical core with shaft portions extending axially from the opposite ends thereof.

3. The apparatus of claim 1 wherein said enclosure includes a bottom wall, and means adjacent said bottom wall defining an outlet from said collection compartment and comprising said drain means; and wherein said condenser means comprises an array of baffle elements spanning said collection compartment and operatively interposed between said means for transporting and said outlet from said compartment, and injection means operatively interposed in the section of said collection compartment that is defined between said array of baffle elements and said outlet, said injection means permitting the injection of water into said compartment section to effect condensation of vaporous substances therewithin.

4. The apparatus of claim 3 wherein said enclosure is so configured as to offset said section of said collection compartment transversely from the remainder thereof and therebelow, wherein said bottom wall of said enclosure declines in the direction of such offset, and wherein said outlet from said collection compartment is disposed adjacent a low point of said bottom wall.

5. A system for cleaning and coating a workpiece, comprising:
   a. cleaning apparatus including:
      an enclosure defining a chamber with entrance and exit openings thereinto and therefrom, a horizontal plane within said chamber demarcating a spray compartment thereabove, and a collection chamber therebelow;
      spray means, disposed within said spray compartment, for discharging steam upon a workpiece transported along said horizontal plane;
      condenser means in said collection compartment for effecting condensation of vaporous substances entering thereinto;
      drain means for withdrawing liquids condensed in said collection compartment; and
      supply means operatively connected to said spray means for supplying steam thereto;
   b. coating means for producing a cloud of electrostatically charged solid particles;
   c. means for transporting a workpiece along a travel path having a first section extending through said chamber and between said openings of said enclosure, and having a second section, downstream of said first section, extending proximate said coating means to enable exposure of the transported workpiece to said cloud for deposition of such particles thereupon, said travel path sections lying substantially entirely in said horizontal plane; and
   d. means for effecting fusion of the particulate deposit produced by said coating means upon the workpiece.

6. The system of claim 5 wherein said coating means comprises an electrostatic fluidized bed unit, and wherein said means for effecting fusion comprises a heating unit, said fluidized bed unit having a porous plate defining a plenum therebelow and a coating chamber thereabove, said second portion of said travel path extending through said coating chamber.

7. The system of claim 6 wherein said means for transporting comprises a conveyor extending along said travel path and having spaced members adapted to rotatably and drivingly engage the ends of oppositely extending shaft portions of a transported workpiece; and wherein said spray means comprises a plurality of nozzles arranged in a bank extending along said first travel path section between and above said spaced members of said conveyor, said system thereby being adapted for the cleaning and coating of armatures having a cylindrical core with shaft portions extending axially from the opposite ends thereof.

8. The system of claim 6 additionally including cooling means disposed along said travel path between said cleaning apparatus and said fluidized bed unit, said cooling means being operative to lower the temperature of the transported workpiece.

* * * * *

US005052332B1

REEXAMINATION CERTIFICATE (3133rd)
United States Patent [19]
Hajek et al.

[11] B1 5,052,332
[45] Certificate Issued Feb. 18, 1997

[54] APPARATUS AND SYSTEM FOR STEAM CLEANING AND COATING OF LAMINATED ARTICLES

[75] Inventors: Bedrich Hajek, New Haven; Donald J. Gillette, Guilford, both of Conn.

[73] Assignee: Electrostatic Technology, Inc., Branford, Conn.

Reexamination Request:
No. 90/004,073, Dec. 20, 1995

Reexamination Certificate for:
Patent No.: 5,052,332
Issued: Oct. 1, 1991
Appl. No.: 493,791
Filed: Mar. 15, 1990

[51] Int. Cl.⁶ ..................................... B05C 5/00
[52] U.S. Cl. ................ 118/72; 118/634; 118/DIG. 5; 134/107; 134/108; 15/302; 15/306.1; 15/309.2

[58] Field of Search .............. 118/72, 634, DIG. 5; 134/105, 107, 108; 15/302, 309.2, 306.1, 309.1

[56] References Cited

U.S. PATENT DOCUMENTS 5,051,136  9/1991  Tuominen ........................ 134/15

Primary Examiner—Laura E. Edwards

[57] ABSTRACT

The apparatus and system utilize sprays of steam to clean the exterior or laminated objects, preliminary to electrostatic powder coating, as well as to effect volatilization of liquid contaminates trapped between lamina thereof. Off-gassing that would otherwise occur when the objects are heated to effect fusion of the powder deposit is thereby avoided. The apparatus includes a conveyor for transporting a workpiece along a horizontal travel path through a chamber, above and below which path a spray compartment and collecting compartment are defined, respectively.

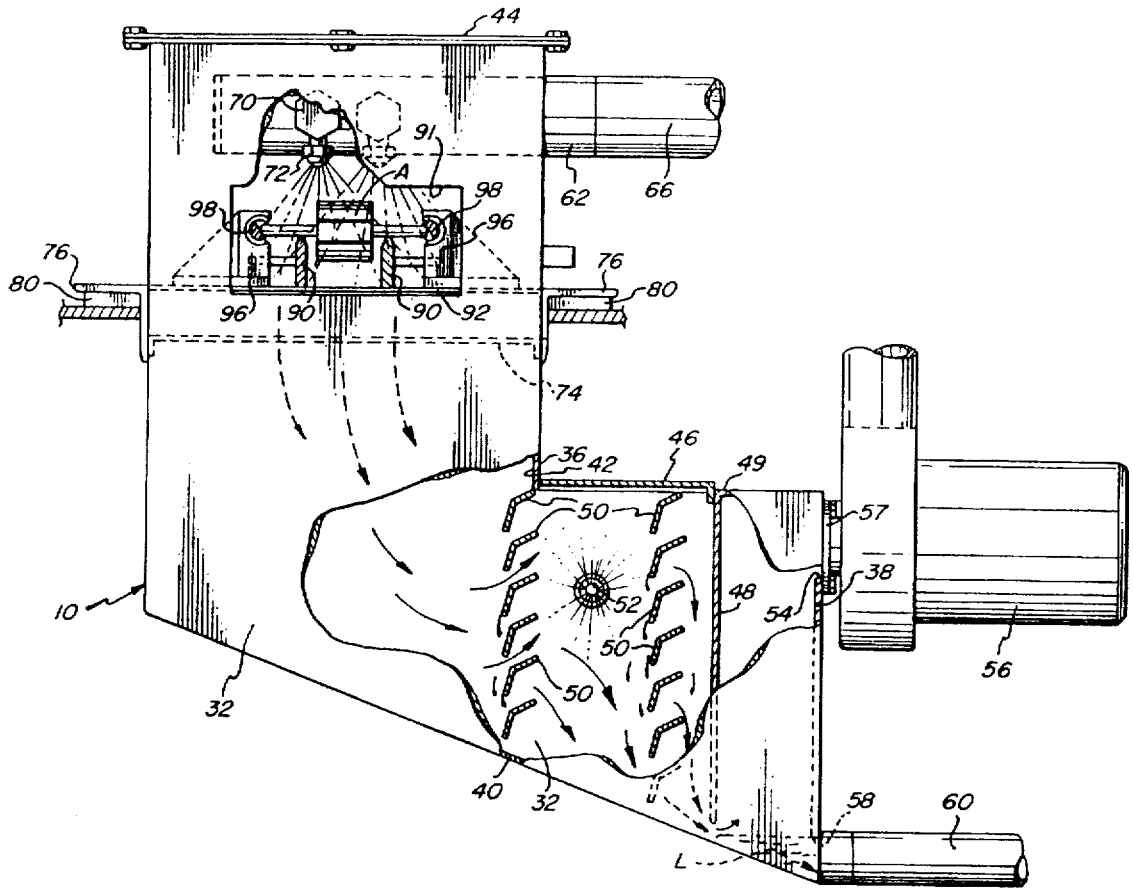

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–8 is confirmed.

New claim 9 is added and determined to be patentable.

*9. Apparatus for cleaning a workpiece transported therethrough, comprising:*

*an enclosure defining a chamber with entrance and exit openings thereinto and therefrom;*

*means for transporting a workpiece along a travel path having a section extending through said chamber and between said openings of said enclosure, said travel path section lying substantially entirely in a single horizontal plane and demarcating within said chamber a spray compartment thereabove and a collection compartment therebelow;*

*spray means, disposed within said spray compartment, for discharging steam upon a workpiece transported along said travel path section;*

*condenser means in said collection compartment for effecting condensation of vaporous substances entering thereinto;*

*drain means for withdrawing liquids condensed in said collection compartment;*

*supply means operatively connected to said spray means for supplying steam thereto; and*

*suction means downstream from said condenser means for drawing steam from said spray compartment into said collection compartment, and for drawing air from said chamber openings through said spray compartment and said collection compartment.*

* * * * *